April 11, 1944. W. A. DUFFIELD 2,346,365
AUTOMATIC SPEED CHANGE GEARING
Filed Oct. 3, 1942 2 Sheets-Sheet 1

INVENTOR.
WILLIAM A. DUFFIELD,
BY Hood & Hahn
ATTORNEYS.

April 11, 1944.   W. A. DUFFIELD   2,346,365
AUTOMATIC SPEED CHANGE GEARING
Filed Oct. 3, 1942    2 Sheets-Sheet 2

INVENTOR.
WILLIAM A. DUFFIELD,
BY Hood & Hahn
ATTORNEYS.

Patented Apr. 11, 1944

2,346,365

UNITED STATES PATENT OFFICE 2,346,365

AUTOMATIC SPEED CHANGE GEARING

William A. Duffield, Windsor, Ontario, Canada, assignor to Windfields, Limited, Montreal, Quebec, Canada, a corporation of Canada Application October 3, 1942, Serial No. 460,612

10 Claims. (Cl. 74—189.5)

The object of my invention is to provide a speed varying transmission of the epicyclic type which will provide for four speeds forward and one reverse, wherein the translations from one forward speed to the next forward speed, either up or down, will be automatic.

The accompanying drawings illustrate my invention.

Figure 1:
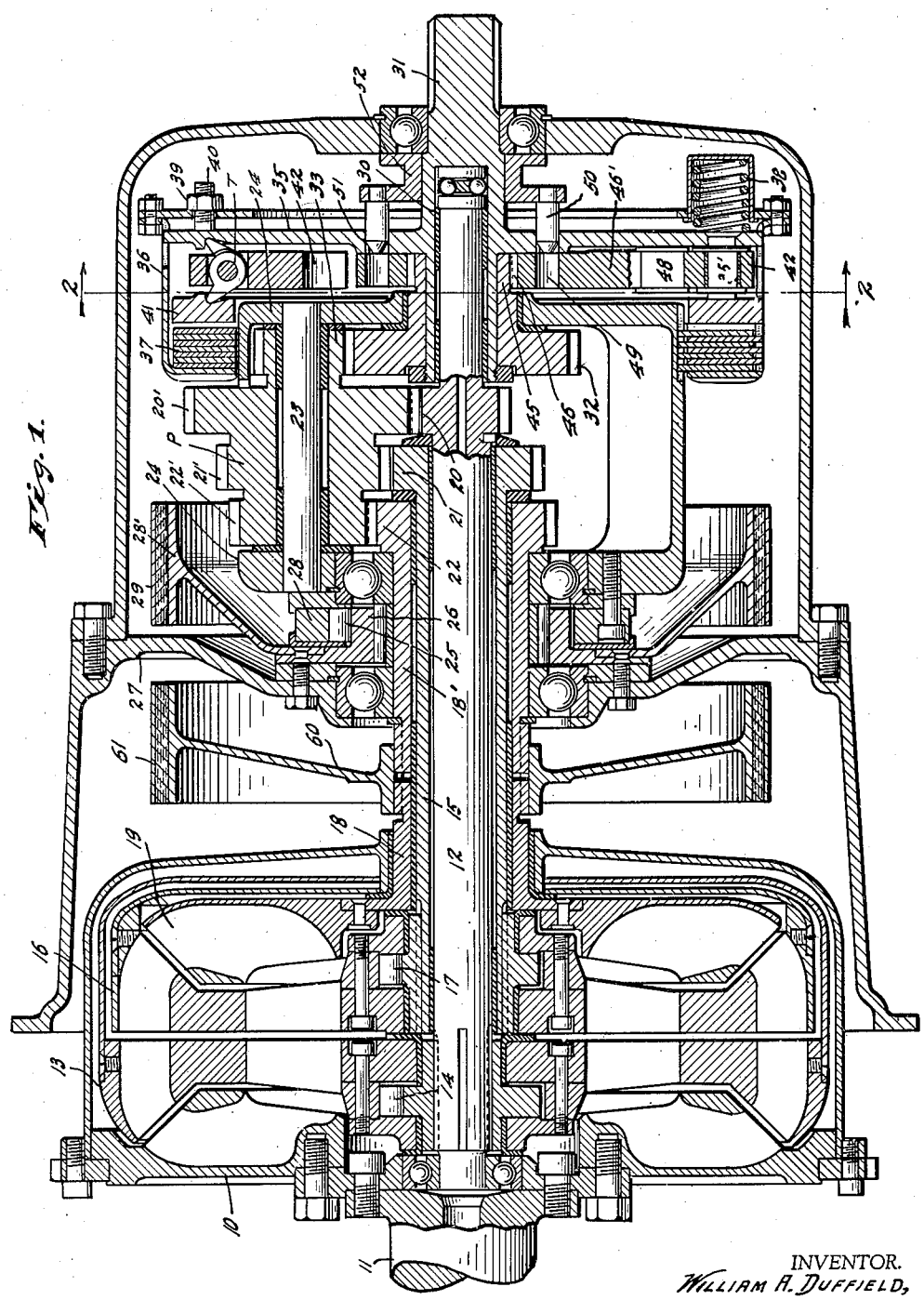

Fig. 1 is an axial section of an embodiment of my invention; and

Figure 2:
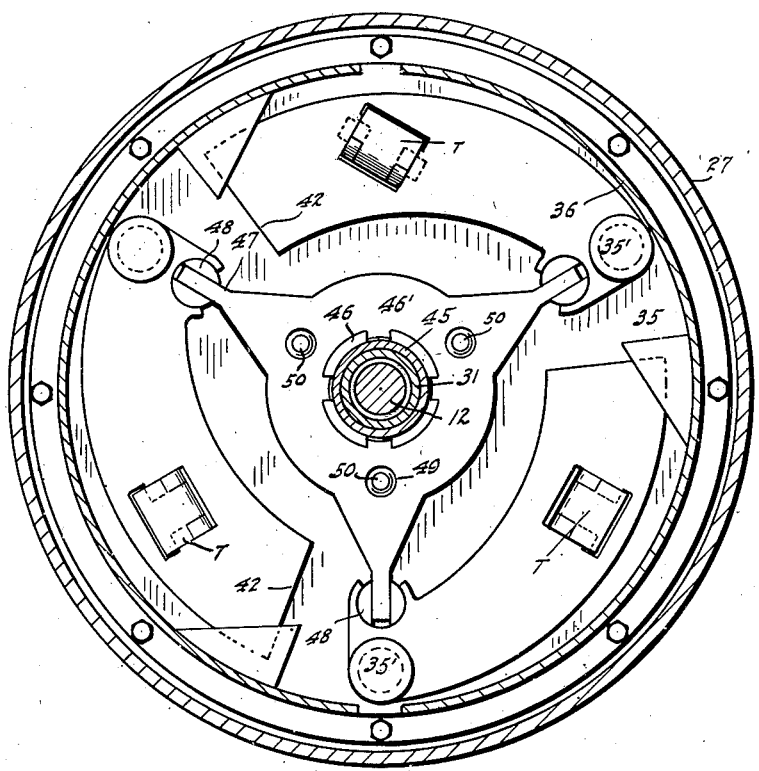

Fig. 2, a transverse section on line 2—2 of Fig. 1.

In the drawings 10 indicates a liquid coupling impeller adapted to be attached to the input shaft 11. Coaxial with impeller 10 is a shaft 12 upon which is journalled the first runner 13 associated with shaft 12 through the medium of an overrunning clutch 14 which will permit forward overrunning of shaft 12 relative to runner 13. Journalled upon shaft 12 is a sleeve shaft 15 upon the inner end of which is journalled the second runner 16 associated with sleeve shaft 15 through the medium of an overrunning clutch 17 which will permit forward overrunning of sleeve shaft 15 relative to runner 16.

Journalled upon the inner end of sleeve shaft 15 is a second sleeve shaft 18, the inner end of which carries the third runner 19. The impeller 10 and runners 13, 16 and 19 are provided with vaned passages, in a well known manner, which will permit flow of coupling liquid from impeller 10 through impellers 13, 16, 19, 16, 13 back to impeller 10.

Shaft 12 carries a first sun gear 20, sleeve shaft 15 carries a second sun gear 21. Journalled on sleeve shaft 15 is a sleeve shaft 18' provided with a third sun gear 22.

The first, second and third sun gears are, respectively, in mesh with gears 20', 21' and 22' of a planetary gear P journalled on the planetary pin 23 carried by gear carrier 24, the axis of which is coaxial with the several sun gears. Reverse rotation of carrier 24 is prevented by a one-way clutch 25 interposed between a sleeve 26 carried by drum 28' and a ring 28 carried by carrier 24. Drum 28' may be held against rotation by means of a brake band 29.

The outer end of shaft 12 is journalled in an axial pocket 30 in the inner end of the output shaft 31 and secured to the inner end of said output shaft is a fourth sun gear 32 which meshes with a gear 33 which is integrated with the planetary gear P.

At an intermediate point in its length, output shaft 31 is provided with a circumferential flange 35 over which is sleeved a clutch casing 36 between which and carrier 24 are interposed a plurality of interdigitated friction rings 37. Interposed between casing 36 and flange 35 are springs 38 which act to yieldingly urge casing 36 to the position shown in Fig. 1 against stop nuts 39 threaded upon pins 40 carried by flange 35. Within casing 36 is a pressure ring 41 and interposed between said pressure ring and flange 35 are toggles T, each of which is carried by the weighted end of a bell crank lever 42 in such manner that when said weighted ends move outwardly under the influence of rotation of the output shaft, the toggles T will serve to clamp pressure ring 41 upon the friction rings 37 so as to clutch the output shaft to the carrier 24. The gear 32 is provided with a sleeve hub 45 having clutch teeth 46 upon its periphery to receive mating clutch teeth formed in the bore of a spider 46' provided with a plurality of radiating arms 47, each of which projects into a diametrical slot of a pin 48 journalled in a pocket formed in the short arm of the adjacent bell crank lever 42. The long arms of the levers 42 are weighted and these levers are pivoted on planetary pins 35' carried by flange 35.

Spider 46' is provided with a plurality of perforations 49 adapted to receive pins 50 which are projected into perforations 51 in flange 35 and are carried by a sliding collar 52 sleeved upon the output shaft 31 and axially slidable, by manually controlled means not shown, so that pins 50 may be projected into spider 46' to lock it against oscillation relative to the output shaft, or to permit such oscillation.

Keyed to and connecting sleeve shafts 18 and 18' is a drum 60 which may be held against rotation by manually controlled brake band 61.

Forward operation is as follows:

Impeller 10 acting on runner 13 drives it forwardly and the flow of power is through gears 20, 20', 33, 32, spider 46', arms 47, levers 42, pins 35' and flange 35 to produce low forward speed of the output shaft 21, carrier 24 being held against reverse rotation by the action of clutch 25 on drum 28 which is restrained by brake 29. At this time, gear 21' acting on gear 21 forwardly rotates sleeve 15, and gear 22' acting on gear 22 rotates runner 19 forwardly at a speed considerably lower than that of the first runner 13. Runner 16 is also advanced by the coupling fluid but at a lower speed than that of runner 13.

In course of time, however, load torque decreases and runner 16 attacks sleeve 15 through clutch 17 whereupon second forward speed is established by a flow of power through gears 21, 21', 33, 32, etc., as in first forward speed. In this relationship gear 20' acting on gear 20 causes shaft 12 to underrun clutch 14 and runner 13.

Upon further decrease of the differential between load torque and engine torque the driving effort on the third runner 19 becomes sufficient to establish third speed forward where the flow of power is through gears 22, 22', 33, 32, etc., as in first and second forward, shaft 12 continuing to underrun runner 13 and sleeve shaft 15 underrunning impeller 16 by reason of clutch 17.

During the periods the load torque is sufficient to restrain levers 42 against sufficient outward movement to activate toggles T, but when differential between load torque and engine torque sufficiently decreases, forward rotation of the output shaft increases enough to cause levers 42 to activate toggles T to clutch output shaft 31 to carrier 24 and thus establish direct drive at high speed. At this time all three runners are acting upon their respective sun gears and carrier 24 is rotating in unison with the output shaft.

Upon increase of load torque, the gearing will drop successively to 3rd, 2nd, and 1st relationships as may be required. The shifting from one relationship, higher or lower, will be entirely automatic, according to the load, without any required manipulation by the operator.

For reverse rotation of the output shaft, drum 28' is released, drum 60 is held by brake 61 and spider 46' locked to the output shaft by pins 50. Sun gear 22 (as well as runner 19) is thus held stationary and the flow of power is from runner 13 through shaft 12, gears 20 and 20', causing gear 22' to roll on stationary gears 22 to produce reverse rotation of carrier 24.

Rotation of gear 33 tends to exert a forward driving effect on the output shaft through gear 32 but the planetary movement of this gear 33 in reverse revolution has a greater effect upon gear 32 and thus causes it, through spider 46' and pins 50, to reversely rotate the output shaft.

It is to be noted that the three input sun gears 20, 21 and 22 and the means for applying power thereto, are so arranged that whenever the load torque applied thereto results in a sun gear speed no greater than that of the power-applying means for that gear, said power-applying means is immediately and automatically effective on that particular sun gear. Therefore, means other than a multi-runner fluid coupling may be utilized to apply power to sun gears 20, 21, 22 without departing from that portion of my invention which relates to the epicyclic gearing itself.

It should be noted that input engine torque is at all times being applied to runners 13, 16 and 19. Consequently, when toggle T acts to unify carrier 24 and the output shaft 31, the load torque is immediately impressed on runner 13 but as soon as output shaft speed drops enough to permit retraction of the toggle T the load torque shifts from runner 13 to runner 19, and thence to runner 16, provided the differential between load torque and engine torque increases, and thence to runner 13, upon further increase of that differential.

I claim as my invention:

1. Epicyclic speed change gearing comprising a power receiving shaft carrying a first sun gear, a power-receiving sleeve shaft sleeved over said first shaft and carrying a second sun gear, a second power-receiving sleeve shaft sleeved over the first sleeve shaft and carrying a third sun gear, a fourth sun gear, an output shaft coaxial with all said sun gears, a driving connection between the fourth sun gear and the output shaft, a planetary carrier coaxial with said gears and shafts, means for blocking reverse rotation of said carrier, means for connecting the planetary carrier and output shaft, a planetary gear unit of relatively immovable gears journalled on said carrier and comprising four sets of gear teeth of different diameters and meshing, respectively, with the four sun gears.

2. Epicyclic speed change gearing comprising a power receiving shaft carrying a first sun gear, a power receiving sleeve shaft sleeved over said first-mentioned shaft and carrying a second sun gear, a power receiving sleeve shaft sleeved over the first-mentioned sleeve shaft and carrying a third sun gear, an output shaft, a fourth sun gear oscillatable on said output shaft, a planetary carrier coaxial with said shafts and gears, a planetary gear unit journalled on said carrier and comprising four sets of gear teeth of varying diameters respectively meshing with the four sun gears, means for preventing reverse rotation of said carrier, a clutching means interposed between said planetary carrier and the output shaft, a speed sensitive actuator for said clutching means carried by the output shaft, and a connection between the fourth sun gear and said actuator opposing response of said actuator to increase of speed of the output shaft.

3. Apparatus of the character specified in claim 1 and including controllable means for holding the third sun gear against rotation.

4. Apparatus of the character specified in claim 2 and including controllable means for holding the third sun gear against rotation, and means for blocking operation of the clutch actuator.

5. Apparatus of the character specified in claim 1 and including a fluid coupling comprising an impeller, a first runner, a one-way clutch between said first runner and the first-mentioned shaft permitting overrunning of said shaft relative to said runner, a second runner, a one-way clutching connection between said second runner and the first-mentioned sleeve shaft permitting overrunning of said sleeve shaft relative to said runner, and a third runner carried by the second sleeve shaft.

6. Apparatus of the character specified in claim 2 and including a fluid coupling comprising an impeller, a first runner, a one-way clutch between said first runner and the first-mentioned shaft permitting overrunning of said shaft relative to said runner, a second runner, a one-way clutching connection between said second runner and the first-mentioned sleeve shaft permitting overrunning of said sleeve shaft relative to said runner, and a third runner carried by the second sleeve shaft.

7. Epicyclic speed change gearing comprising a power-receiving shaft carrying a first sun gear, a power-receiving sleeve shaft sleeved over said first shaft and carrying a second sun gear larger than the first sun gear, a second power-receiving sleeve shaft sleeved over the first sleeve shaft and carrying a third sun gear larger than the second sun gear, a fourth sun gear larger than the third sun gear, an output shaft coaxial with all said sun gears, a driving connection between said fourth sun gear and output shaft, a planetary carrier coaxial with said sun gear, means for blocking reverse rotation of said carrier, means for connecting said carrier and output shaft, a planetary gear unit of relatively immovable gears journalled on said carrier and carrying four sets of gear teeth of different diameters meshing respectively with the four sun gears.

8. Apparatus of the character specified in claim 7 and including a fluid coupling comprising an impeller, a first runner, a one-way clutch between said first runner and the first-mentioned shaft permitting overrunning of said shaft relative to said runner, a second runner, a one-way clutching connection between said second runner and the first-mentioned sleeve shaft permitting overrunning of said sleeve shaft relative to said runner, and a third runner carried by the second sleeve shaft.

9. Epicyclic speed change gearing comprising a power receiving shaft carrying a first sun gear, a power-receiving sleeve shaft sleeved over said first shaft and carrying a second sun gear, a second power-receiving sleeve shaft sleeved over the first sleeve shaft and carrying a third sun gear, a fourth sun gear, an output shaft coaxial with all said sun gears, a driving connection between the fourth sun gear and the output shaft, a planetary carrier coaxial with said gears and shafts, means for blocking reverse rotation of said carrier, means for connecting the planetary carrier and output shaft, a planetary gear unit of relatively immovable gears journalled on said carrier and comprising four sets of gear teeth of different diameters and meshing, respectively, with the four sun gears, a primary power delivering element, and three non-connectible secondary power delivering elements arranged in series and connected respectively with the first, second and third sun gears, the first secondary element receiving power from the primary power delivering element, the second secondary element receiving power from the first secondary element, and the third secondary element receiving power from the second secondary element.

10. Apparatus of the character specified in claim 9 and including controllable means for holding the third sun gear against rotation.

WILLIAM A. DUFFIELD.